United States Patent
Lisk et al.

(10) Patent No.: US 11,354,392 B2
(45) Date of Patent: Jun. 7, 2022

(54) DUAL INTERFACE SMART CARD AND METHOD FOR FORMING A DUAL INTERFACE SMART CARD

(71) Applicant: Infineon Technologies AG, Neubiberg (DE)

(72) Inventors: Timo Lisk, Neubiberg (DE); Wolfgang Schindler, Regenstauf (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/075,771

(22) Filed: Oct. 21, 2020

(65) Prior Publication Data
US 2021/0117526 A1    Apr. 22, 2021

(30) Foreign Application Priority Data
Oct. 22, 2019   (DE) .......................... 102019128474.0

(51) Int. Cl.
*G06F 21/32*   (2013.01)
*G06Q 20/34*   (2012.01)
*G06Q 20/40*   (2012.01)

(52) U.S. Cl.
CPC ........... *G06F 21/32* (2013.01); *G06Q 20/341* (2013.01); *G06Q 20/40145* (2013.01)

(58) Field of Classification Search
USPC ................................................. 235/380, 492
See application file for complete search history.

(56) References Cited

U.S. PATENT DOCUMENTS

| | | | | |
|---|---|---|---|---|
| 2008/0072423 | A1* | 3/2008 | Finn | G06K 19/07779 29/854 |
| 2008/0265017 | A1* | 10/2008 | West | G06Q 20/341 235/379 |
| 2011/0102141 | A1* | 5/2011 | Wu | G06Q 20/40145 340/5.82 |
| 2019/0340398 | A1* | 11/2019 | Mosteller | G06Q 20/40145 |
| 2020/0090017 | A1* | 3/2020 | Arai | G06K 19/07354 |
| 2021/0034726 | A1* | 2/2021 | Knausz | G06Q 20/341 |

FOREIGN PATENT DOCUMENTS

| | | |
|---|---|---|
| WO | 2018/035258 A1 | 2/2018 |
| WO | 2019/004905 A1 | 1/2019 |

OTHER PUBLICATIONS

German Patent Office, Office Action issued for DE 102019128474.0, 8 pgs., dated Jun. 19, 2020.

* cited by examiner

*Primary Examiner* — Allyson N Trail
(74) *Attorney, Agent, or Firm* — Banner & Witcoff Ltd.

(57) ABSTRACT

A dual interface smart card having a smart card body, a contact-based interface for contact-based communications, a first security chip which is arranged in the smart card body and is electrically conductively coupled to the contact-based interface, a fingerprint sensor arranged in the smart card body, a second security chip, which is coupled to the fingerprint sensor and is configured to carry out a fingerprint verification by means of fingerprint signals detected by the fingerprint sensor, and an antenna coupled to the second security chip.

11 Claims, 6 Drawing Sheets

FIG. 1
Conventional
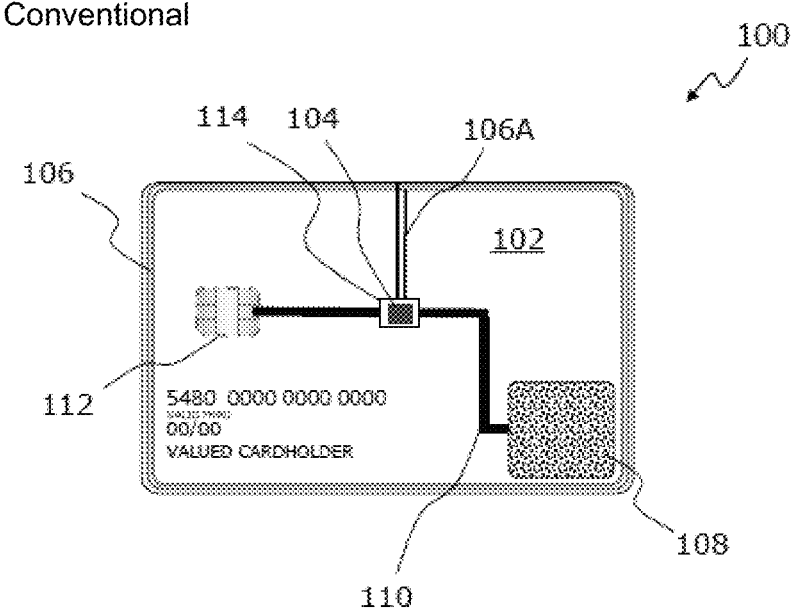

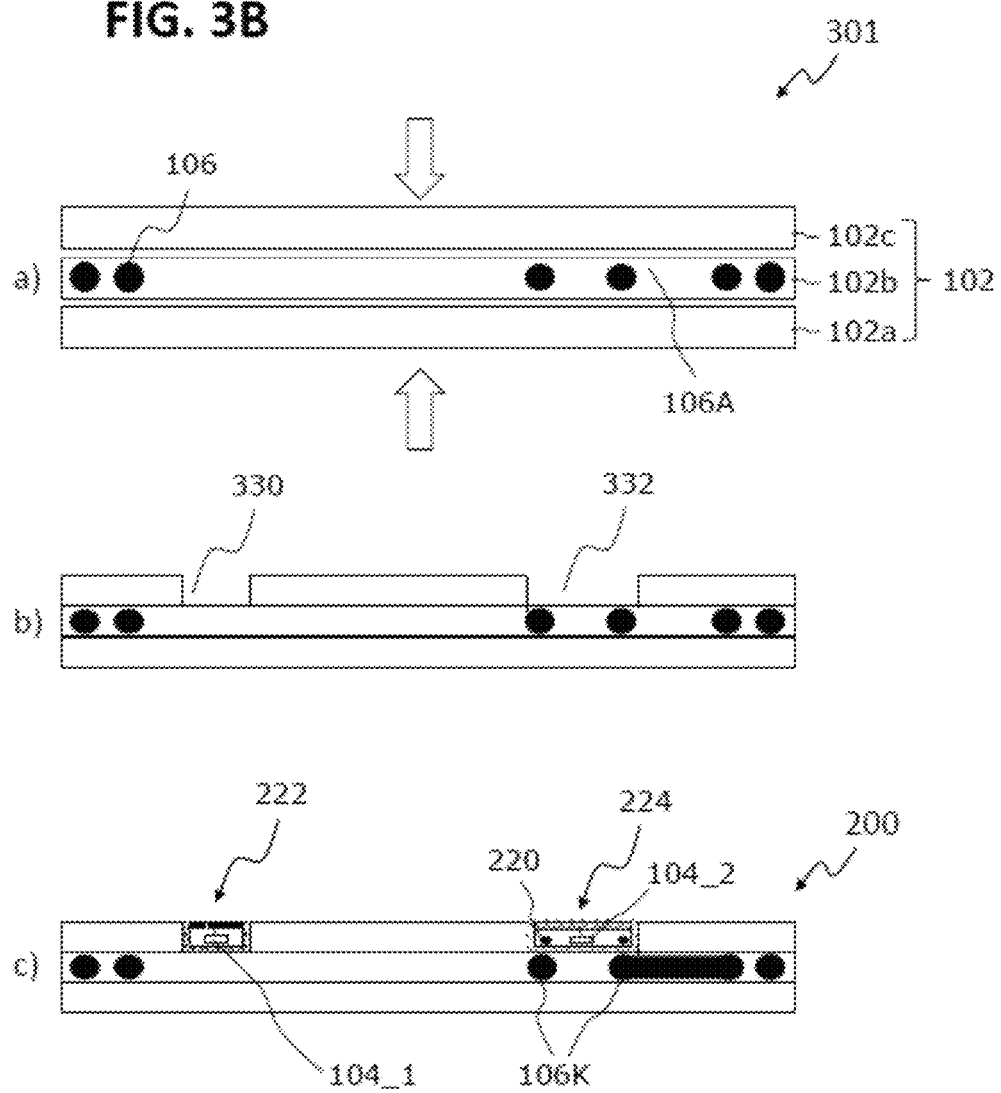

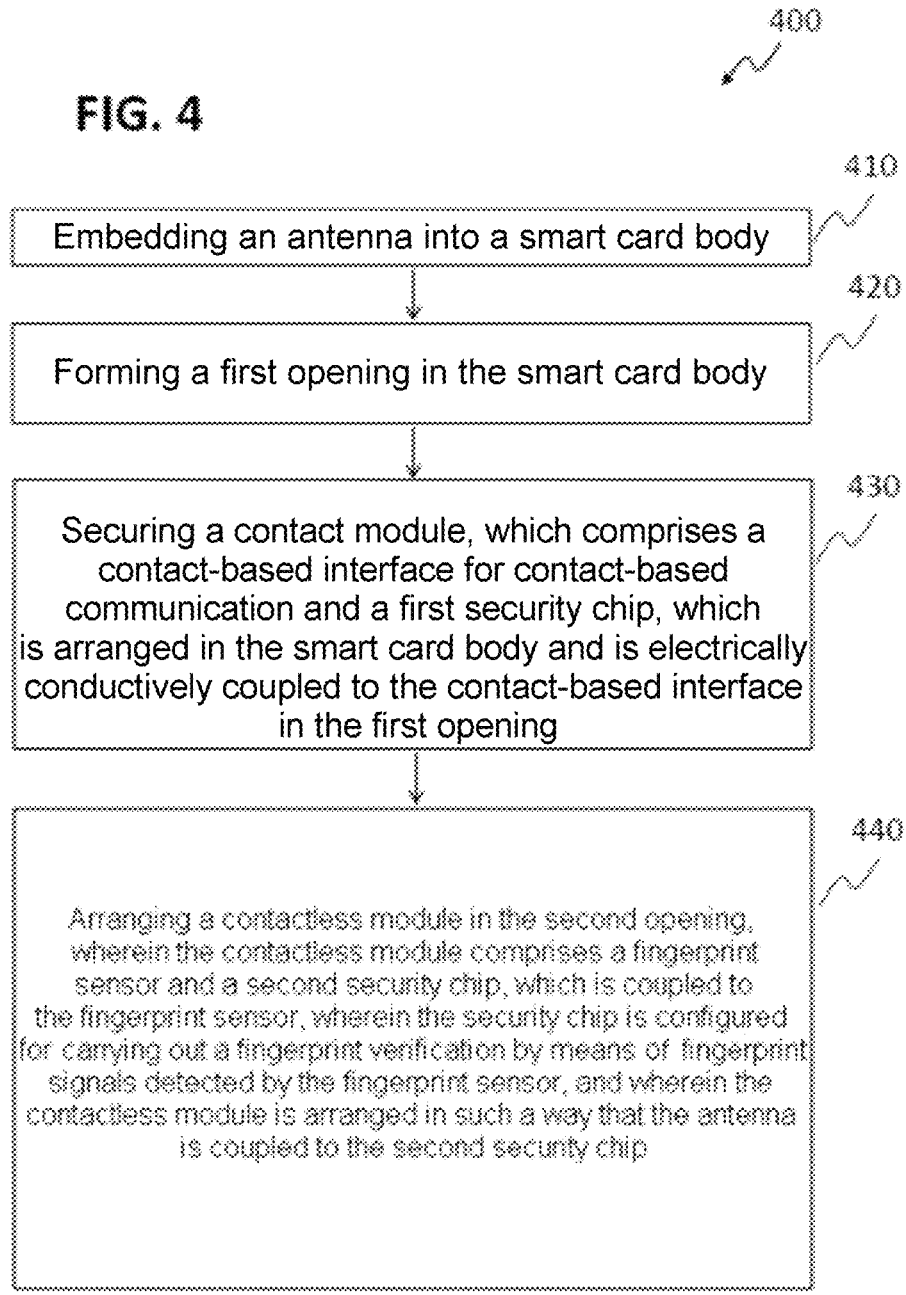

DUAL INTERFACE SMART CARD AND METHOD FOR FORMING A DUAL INTERFACE SMART CARD

TECHNICAL FIELD

The disclosure relates to a dual interface smart card and a method for forming a dual interface smart card.

BACKGROUND

Biometric dual interface fingerprint smart cards (see FIG. 1 for an exemplary conventional dual interface smart card 100) are very expensive and difficult to handle during production, e.g. during a lamination process. One reason for this is the components deviating from customary standard, such as e.g. printed circuits boards (PCBs), flexible inlay layers accommodating the additional controller, the capacitors, etc. These components may be necessary because a security element 104 is connected both to an antenna 106 and to the ISO contact area 112 and the biometric fingerprint card sensor 108.

SUMMARY

In various exemplary embodiments, a biometric dual interface smart card with fingerprint recognition is provided, comprising a standard chip (or a standard chip module) for contact-based transactions in accordance with ISO 7816 and an additional (contactless) security chip (also referred to as security element (SE)), used exclusively for contactless transactions in conjunction with a fingerprint authentication. The contactless security chip can have a higher power than the chip for the contact-based transactions.

An electrically conductive connection between the chip for the contact-based transactions and the contactless security chip (or an antenna coupled thereto) can thus be dispensed with. To put it another way, the chip for the contact-based transactions can be electrically insulated from the contactless security chip.

Production of the dual interface smart card can thus be simplified. By way of example, the dual interface smart card can be produced by having recourse only to tools that are currently used for producing a conventional dual interface smart card.

BRIEF DESCRIPTION OF THE DRAWINGS

Exemplary embodiments of the disclosure are illustrated in the figures and are explained in greater detail below.

In the figures:

FIG. 1 shows a schematic plan view of the front side of a conventional dual interface smart card;

FIGS. 3A and 3B respectively show an illustration of a method for forming a dual interface smart card in accordance with various exemplary embodiments; and FIG. 4 shows a flow diagram of a method for forming a dual interface smart card in accordance with various exemplary embodiments.

DETAILED DESCRIPTION

Figure 2A:
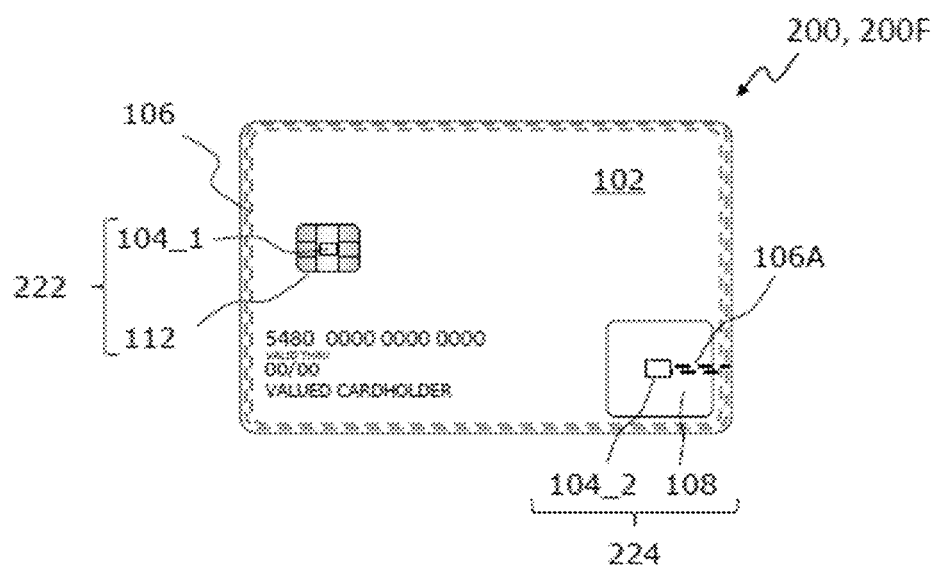
FIGS. 2A and 2B respectively show a schematic plan view above the front side and the rear side of a dual interface smart card in accordance with various exemplary embodiments.
Figure 2A:
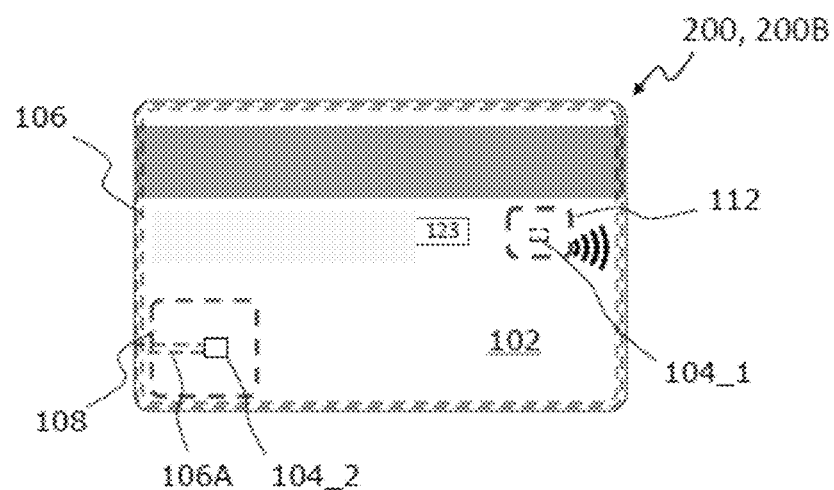

In the following detailed description, reference is made to the accompanying drawings, which form part of this description and show for illustration purposes specific embodiments in which the disclosure can be implemented. In this regard, direction terminology such as, for instance, "at the top", "at the bottom", "at the front", "at the back", "front", "rear", etc. is used with respect to the orientation of the figure(s) as described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present disclosure. It goes without saying that the features of the various exemplary embodiments described herein can be combined with one another, unless specifically indicated otherwise. Therefore, the following detailed description should not be interpreted in a restrictive sense, and the scope of protection of the present disclosure is defined by the appended claims.

In the context of this description, the terms "connected", "attached" and "coupled" are used to describe either a direct or an indirect connection, a direct or indirect attachment and a direct or indirect coupling. In the figures, identical or similar elements are provided with identical reference signs, insofar as this is expedient.

Nowadays a biometric verification/authentication by means of a fingerprint is used principally during contactless transactions.

In this type of transaction, the fingerprint authentication can reduce a risk of improper use and/or make it possible to carry out transactions whose value lies above a crucial threshold at which at present an additional verification by the user (e.g. by means of inputting a PIN) is required.

In a configuration in accordance with various exemplary embodiments, a high-power security chip can be arranged together with the fingerprint sensor in a package. Conventional components can be used for the contact-based communication.

The high-power security chip can be electrically insulated from the rest of the smart card, in particular from the components for the contact-based communication.

In various exemplary embodiments, the fingerprint authentication is restricted to the contactless interface because the other interfaces, such as e.g. the contact-based interface of the dual interface smart card, for an application in which the fingerprint is used for verification, are not suitable if only owing to the design.

By dispensing with the use of the fingerprint authentication in connection with the contact-based interface, it is possible to use a high-power chip for the biometric application and the contactless application, whereas a chip with lower power can be sufficient for the contact-based transactions (e.g. payment processes).

Furthermore, in various exemplary embodiments, it is possible to reduce a number of inputs/outputs (General Purpose Input Output, GPIO) at the high-power security chip. Moreover, a card quality is improved with regard to standards to be complied with (e.g. Mastercard CQM), and card design, verification and production are simplified.

Figure 2B:
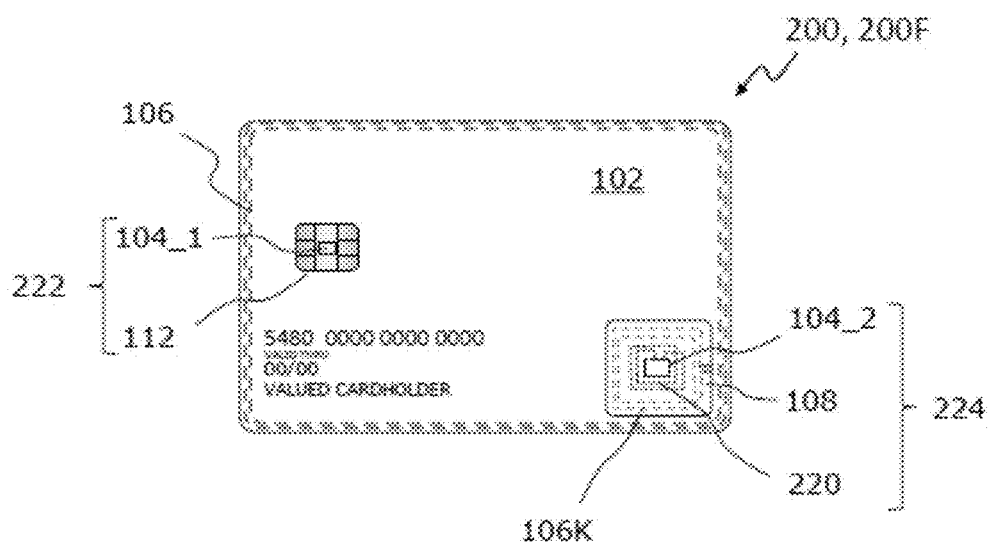
Figure 2B:
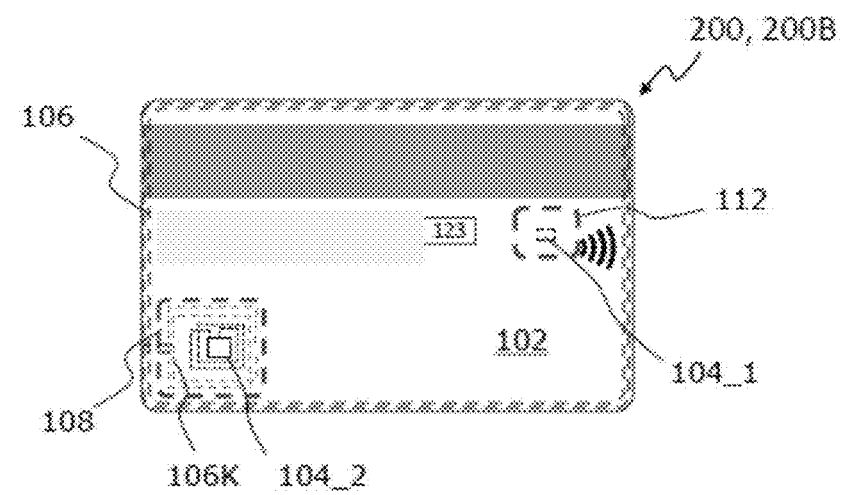

FIG. 2A and FIG. 2B respectively show a schematic plan view of a front side (top) and the rear side (bottom) of a dual interface smart card 200 in accordance with various exemplary embodiments.

Figure 3A:
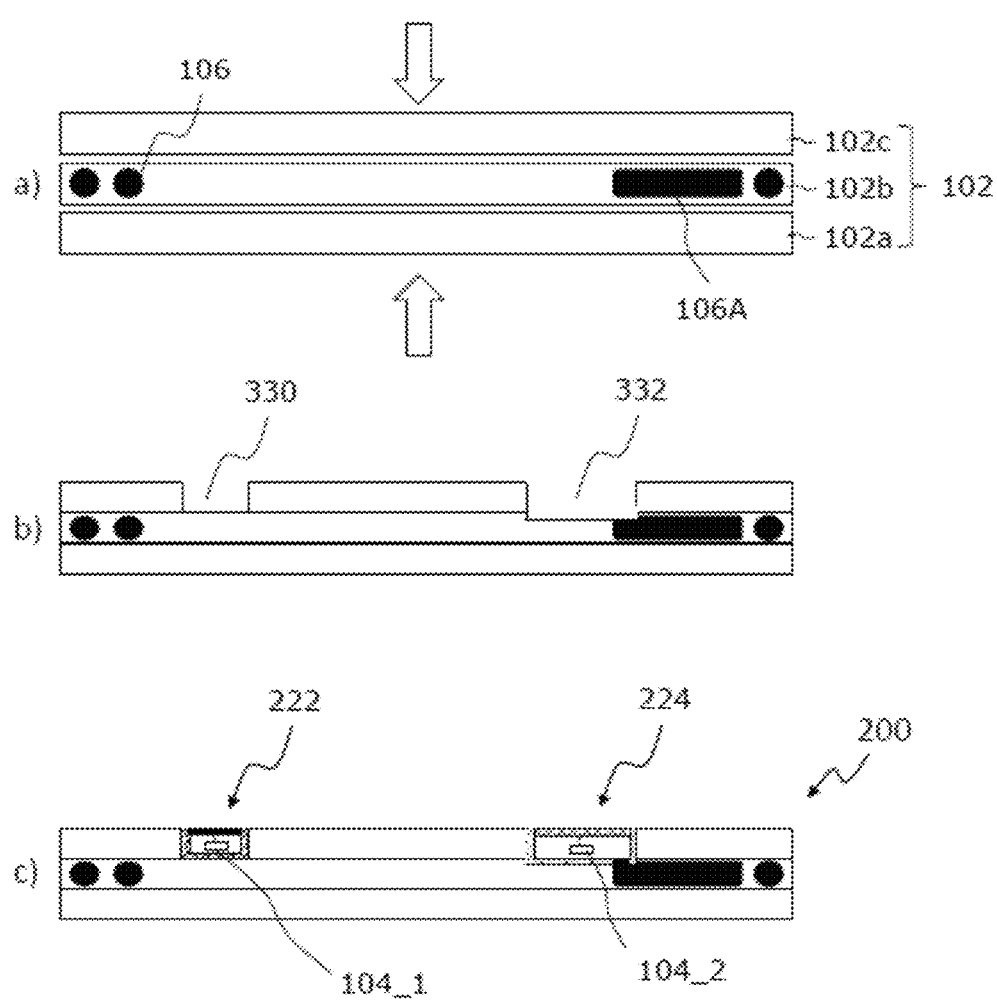

FIG. 3A and FIG. 3B respectively show an illustration of a method for forming a dual interface smart card in accordance with various exemplary embodiments.

In accordance with various exemplary embodiments, a dual interface smart card 200 can comprise a smart card body 102, a contact-based interface 112 for contact-based communication, and a first security chip 104_1, which is arranged in the smart card body and is electrically conductively coupled to the contact-based interface. The dual interface smart card 200 can furthermore comprise a fingerprint sensor 108 arranged in the smart card body 102, a second security chip 104_2, which is coupled to the fingerprint sensor 108 and is configured for carrying out a fingerprint verification by means of fingerprint signals detected by the fingerprint sensor 108, and an antenna 106 coupled to the second security chip 104_2. That is illustrated in the schematic plan views from FIG. 2A and FIG. 2B and the schematic cross-sectional views from FIG. 3A and FIG. 3B (the bottommost illustration in each case).

The smart card body 102 can be formed in a substantially known manner. By way of example, the smart card body 102 can be formed as a layer stack made from a plurality of layers 102a, 102b, 102c, as is illustrated in FIG. 3A and FIG. 3B (at the top in each case). Here for example the antenna 106 can be formed on or in one of the layers (here: 102b) and can be laminated into the layer stack.

The contact-based interface 112 can be configured, for example, in accordance with ISO 7816. It can be exposed at a surface of the dual interface smart card 200 for the purpose of contacting by means of an external reader.

The first security chip 104_1 can be configured in a substantially known manner for carrying out transactions that require increased security, such as, for example, payment functions, access regulations or the like.

The first security chip 104_1 together with the contact-based interface 112 can be part of a first chip module 222. The first chip module 222 can be formed as a package.

The fingerprint sensor 108 can be provided in a substantially known manner. It can be exposed at a surface of the dual interface smart card 200 in order to be touched by means of a finger. An image captured by means of the fingerprint sensor 108 can be forwarded via an electrically conductive connection (see FIG. 3A and FIG. 3B, at the bottom in each case) to the second security chip 104_2 and can be compared with images stored there in order to confirm or deny authorization of the person who has provided the fingerprint.

The second security chip 104_2 can likewise be configured for carrying out transactions that require increased security, such as, for example, payment functions, access regulations or the like, and that require as well the additional security level of a biometric authentication (here by means of the fingerprint).

Accordingly, the security chip 104_2 together with the antenna 106 can form the contactless interface, which can be configured in accordance with ISO/IEC 14443, for example.

The second security chip 104_2 together with the fingerprint sensor 108 can be part of a second chip module 224. The second chip module 224 can be formed as a package, for example as a package having a very thin surface mounted device (SMD), or as what is called (in German too) a system-in-package having the sensor 108 and the second security chip 104_2.

In various exemplary embodiments, the first chip module 222 and the second chip module 224 can form systems which are completely independent of one another with regard to their functionality. Accordingly, the second security chip 104_2 and the contact-based interface 112 can be electrically insulated from one another. The second security chip 104_2 and the first security chip 104_1 can likewise be electrically insulated from one another.

In various exemplary embodiments, a coupling of the antenna 106 to the second security chip 104_2 can be formed as an electrically conductive connection 106A, as is shown in FIG. 2A and FIG. 3A, for example.

In various exemplary embodiments, a coupling of the antenna 106 to the second security chip 104_2 can be formed as an inductive coupling. The dual interface smart card 200 can comprise a coupling antenna 220, which is electrically conductively connected to the second security chip 104_2. The antenna 106 can comprise a coupling region 106K, which is arranged and tuned such that it is coupled inductively to the second security chip 104_2 by means of the coupling antenna 220 when the second chip module 224 is arranged in the card body 102. Such a configuration is also referred to as Coil on Module (CoM), as is shown in FIG. 2B and FIG. 3B, for example.

In the illustrations of the method for forming a dual interface smart card 200 in accordance with various exemplary embodiments in FIG. 3A and FIG. 3B, forming the smart card body 102 is illustrated at the top in each case as laminating, wherein the arrows symbolize a force action, that is to say pressing together the layers 102a, 102b, 102c. Optionally, heat can furthermore be supplied.

FIG. 3A and FIG. 3B show in the center in each case a process of forming a first opening 330 for receiving the first security chip 104_1 and the contact-based interface 112 (e.g. as the first chip module 222) and a process of forming a second opening 332 for receiving the second security chip 104_2 and the fingerprint sensor 108 (e.g. as the second chip module 224). In FIG. 3B, a connection region 106A of the antenna 106 is exposed during the process of forming the second opening 224.

FIG. 3A and FIG. 3B show at the bottom in each case a process of inserting the first security chip 104_1 and the contact-based interface 112 (e.g. as the first chip module 222) into the first opening 330 (FIG. 3A) and respectively a process of inserting the second security chip 104_1 and the fingerprint sensor 108 (e.g. as the second chip module 224) into the second opening 332 (FIG. 3B).

In the case of the dual interface smart card 200 illustrated in FIG. 3A and comprising the electrically conductive connection between the second security chip 104_2 and the antenna 106, securing the second security chip 104_2 can be effected by means of a conductive adhesion medium, for example by means of an anisotropic conductive adhesive.

In the case of the dual interface smart card 200 illustrated in FIG. 3B and comprising the Coil on Module connection between the second security chip 104_2 and the antenna 106, securing the second security chip 104_2 can be effected by means of a dielectric adhesion medium, for example by means of a nonconductive adhesive.

FIG. 4 shows a flow diagram 400 of a method for forming a dual interface smart card in accordance with various exemplary embodiments.

The method can comprise embedding an antenna into a smart card body (at 410), forming a first opening and a second opening in the smart card body (at 420), securing a contact module, which comprises a contact-based interface for contact-based communication and a first security chip, which is arranged in the smart card body and is electrically conductively coupled to the contact-based interface, in the first opening (at 430), and arranging a contactless module in the second opening, wherein the contactless module comprises a fingerprint sensor and a second security chip, which is coupled to the fingerprint sensor, wherein the security chip is configured for carrying out a fingerprint verification by means of fingerprint signals detected by the fingerprint sensor, and wherein the contactless module is arranged in such a way that the antenna is coupled to the second security chip (at 440).

Some exemplary embodiments are specified in summary below.

Exemplary embodiment 1 is a dual interface smart card, comprising a smart card body, a contact-based interface for contact-based communications; a first security chip which is arranged in the smart card body and is electrically conductively coupled to the contact-based interface, a fingerprint sensor arranged in the smart card body, a second security chip, which is coupled to the fingerprint sensor and is configured for carrying out a fingerprint verification by means of fingerprint signals detected by the fingerprint sensor, and an antenna coupled to the second security chip.

Exemplary embodiment 2 is a dual interface smart card according to exemplary embodiment 1, wherein the second security chip is electrically insulated from the contact-based interface.

Exemplary embodiment 3 is a dual interface smart card according to exemplary embodiment 1 or 2, wherein the antenna is electrically conductively coupled to the second security.

Exemplary embodiment 4 is a dual interface smart card according to exemplary embodiment 1 or 2, furthermore comprising a coupling antenna, which is electrically conductively connected to the second security chip, wherein the antenna is coupled to the second security chip inductively by means of the coupling antenna.

Exemplary embodiment 5 is a dual interface smart card according to any of exemplary embodiments 1 to 4, wherein the second security chip and the fingerprint sensor are integrated in the same package.

Exemplary embodiment 6 is a dual interface smart card according to any of the exemplary embodiments 1 to 5, wherein the contact-based interface is considered in accordance with ISO 7816.

Exemplary embodiment 7 is a dual interface smart card according to any of exemplary embodiments 1 to 6, wherein the second security chip in combination with the antenna forms a contactless interface.

Exemplary embodiment 8 is a dual interface smart card according to exemplary embodiment 7, wherein the contactless interface is configured in accordance with ISO/IEC 14443.

Exemplary embodiment 9 is a method for forming a dual interface smart card. The method comprises embedding an antenna into a smart card body, forming a first opening and a second opening in the smart card body, securing a contact module, which comprises a contact-based interface for contact-based communication and a first security chip, which is arranged in the smart card body and is electrically conductively coupled to the contact-based interface, in the first opening, and securing a contactless module in the second opening, wherein the contactless module comprises a fingerprint sensor and a second security chip, which is coupled to the fingerprint sensor, wherein the security chip is configured for carrying out a fingerprint verification by means of fingerprint signals detected by the fingerprint sensor, and wherein the contactless module is arranged in such a way that the antenna is coupled to the second security chip.

Exemplary embodiment 10 is a method according to exemplary embodiment 9, wherein the second security chip is electrically insulated from the contact-based interface.

Exemplary embodiment 11 is a method according to exemplary embodiment 9 or 10, wherein forming the second opening is effected in such a way that a contact region of the antenna is exposed, and wherein securing the contactless module is effected by means of an electrically conductive adhesive in such a way that an electrically conductive connection between the antenna and the second security chip is formed.

Further advantageous configurations of the device are evident from the description of the method and vice versa.

The invention claimed is:

1. A dual interface smart card, comprising:
   a smart card body;
   a contact-based interface for contact-based communications;
   a first security chip which is arranged in the smart card body and is electrically conductively coupled to the contact-based interface;
   a fingerprint sensor arranged in the smart card body;
   a second security chip, which is coupled to the fingerprint sensor and is configured to carry out a fingerprint verification by means of fingerprint signals detected by the fingerprint sensor; and
   an antenna directly coupled to the second security chip and lacking a coupling to the first security chip.

2. The dual interface smart card as claimed in claim 1, wherein the second security chip is electrically insulated from the contact-based interface.

3. The dual interface smart card as claimed in claim 1, wherein the antenna is electrically conductively coupled to the second security chip.

4. The dual interface smart card as claimed in claim 1, further comprising:
   a coupling antenna, which is electrically conductively connected to the second security chip,
   wherein the antenna is coupled to the second security chip inductively by means of the coupling antenna.

5. The dual interface smart card as claimed in claim 1, wherein the second security chip and the fingerprint sensor are integrated in the same package.

6. The dual interface smart card as claimed in claim 1, wherein the contact-based interface is configured in accordance with ISO 7816.

7. The dual interface smart card as claimed in claim 1, wherein the second security chip in combination with the antenna forms a contactless interface.

8. The dual interface smart card as claimed in claim 7, wherein the contactless interface is configured in accordance with ISO/IEC 14443.

9. A method for forming a dual interface smart card, comprising:
   embedding an antenna into a smart card body;
   forming a first opening and a second opening in the smart card body;
   securing a contact module, which comprises a contact-based interface for contact-based communication and a first security chip, which is arranged in the smart card body and is electrically conductively coupled to the contact-based interface, in the first opening; and
   securing a contactless module in the second opening, wherein the contactless module comprises a fingerprint sensor and a second security chip, which is coupled to the fingerprint sensor, wherein the security chip is configured to carry out a fingerprint verification by means of fingerprint signals detected by the fingerprint sensor, wherein the contactless module is arranged such that the antenna is directly coupled to the second security chip and lacks a coupling to the first security chip.

10. The method as claimed in claim 9,
wherein the second security chip is electrically insulated from the contact-based interface.

11. The method as claimed in claim 9,
wherein forming the second opening is effected such that a contact region of the antenna is exposed, and
wherein securing the contactless module is effected by means of an electrically conductive adhesive such that an electrically conductive connection between the antenna and the second security chip is formed.

* * * * *